(12) United States Patent
Takei et al.

(10) Patent No.: US 10,673,028 B2
(45) Date of Patent: Jun. 2, 2020

(54) ELECTROCHEMICAL ELEMENT

(71) Applicant: Maxell Holdings, Ltd., Kyoto (JP)

(72) Inventors: Yuki Takei, Kyoto (JP); Yukihiro Hata, Kyoto (JP); Kiyoharu Hosoya, Kyoto (JP)

(73) Assignee: Maxwell Holdings, Ltd., Kyoto (JP)

( * ) Notice: Subject to any disclaimer, the term of this patent is extended or adjusted under 35 U.S.C. 154(b) by 126 days.

(21) Appl. No.: 16/124,456

(22) Filed: Sep. 7, 2018

(65) Prior Publication Data

US 2019/0097186 A1  Mar. 28, 2019

(30) Foreign Application Priority Data

Sep. 28, 2017  (JP) .................................. 2017-188807
Jul. 17, 2018  (JP) .................................. 2018-134101

(51) Int. Cl.
| | | |
|---|---|---|
| *H01M 2/02* | (2006.01) | |
| *H01M 10/0525* | (2010.01) | |
| *H01M 2/08* | (2006.01) | |
| *H01M 2/30* | (2006.01) | |
| *H01M 10/0587* | (2010.01) | |

(Continued)

(52) U.S. Cl.
CPC .......... *H01M 2/0267* (2013.01); *H01G 9/008* (2013.01); *H01G 9/02* (2013.01); *H01G 9/048* (2013.01); *H01G 9/10* (2013.01); *H01M 2/0277* (2013.01); *H01M 2/06* (2013.01); *H01M 2/08* (2013.01); *H01M 2/30* (2013.01);

(Continued)

(58) Field of Classification Search
CPC combination set(s) only.
See application file for complete search history.

(56) References Cited

U.S. PATENT DOCUMENTS 3,706,616 A * 12/1972 Bergum .................. H01M 4/04
  29/623.3
6,743,546 B1 * 6/2004 Kaneda .................. H01M 2/021
  429/127

(Continued)

FOREIGN PATENT DOCUMENTS

JP  2006-004777 A  1/2006

*Primary Examiner* — Kaity V Chandler
(74) *Attorney, Agent, or Firm* — Muncy, Geissler, Olds & Lowe, P.C.

(57) ABSTRACT

[Problem] The present invention provides an electrochemical element having an electrode body covered with a laminate-film jacket; the electrochemical element is structured to prevent damage and short-circuiting of a positive electrode lead while making it possible to prevent decreased sealing ability of the laminate-film jacket.
[Solution] A laminate-type cell 1 includes: an electrode body 10; a positive terminal 41; a laminate-film jacket 20; a positive electrode sealing material 45 located between the positive terminal 41 and the laminate-film jacket 20; and an insulating material 55. The positive terminal 41 and the positive electrode sealing material 45 include a plurality of bending portions 51a, 51b inside the laminate-film jacket 20. The insulating material 55 coats a part of the positive electrode sealing material 45 near the electrode body 10. The positive electrode sealing material 45 includes a positive-electrode insulated portion 51c coated with the insulating material 55 and a positive-electrode welded portion 51d pinched by the laminate-film jacket 20.

15 Claims, 6 Drawing Sheets

(51) Int. Cl.
  *H01G 9/02* (2006.01)
  *H01G 9/008* (2006.01)
  *H01G 9/10* (2006.01)
  *H01G 9/048* (2006.01)
  *H01M 2/06* (2006.01)
(52) U.S. Cl.
  CPC .... *H01M 10/0525* (2013.01); *H01M 10/0587* (2013.01); *H01M 2002/0297* (2013.01)

(56) References Cited

U.S. PATENT DOCUMENTS

| | | | |
|---|---|---|---|
| 2004/0033416 A1* | 2/2004 | Kim | H01M 2/021 429/175 |
| 2004/0038125 A1* | 2/2004 | Kim | H01M 2/021 429/162 |
| 2007/0196732 A1* | 8/2007 | Tatebayashi | H01M 2/22 429/181 |
| 2010/0266881 A1* | 10/2010 | You | H01M 2/0277 429/56 |
| 2012/0121965 A1* | 5/2012 | Makino | H01M 2/22 429/156 |
| 2012/0202105 A1* | 8/2012 | Shinyashiki | H01M 2/22 429/153 |
| 2012/0288746 A1* | 11/2012 | Abe | H01M 2/0287 429/162 |
| 2015/0037658 A1* | 2/2015 | Maeda | H01M 10/0463 429/161 |
| 2015/0111091 A1* | 4/2015 | Lee | H01M 4/66 429/163 |

* cited by examiner

ELECTROCHEMICAL ELEMENT

CROSS-REFERENCES TO RELATED APPLICATIONS

The present application claims priority under 35 U.S.C. § 119 to Japanese Patent Application No. 2017-188807, filed Sep. 28, 2017 and Japanese Patent Application No. 2018-134101, filed Jul. 17, 2018. The contents of these applications are incorporated herein by reference in their entirety.

TECHNICAL FIELD

The present invention relates to an electrochemical element with an electrode body covered with a laminate-film jacket.

BACKGROUND ART

Electrochemical elements are known which have electrode body including a positive electrode and a negative electrode covered with a laminate-film jacket while the peripheral portions of the laminate-film jacket are welded.

For example, the cell disclosed in Patent Document 1 is known as an electrochemical element having the electrode body covered with a laminate-film jacket as described above. The cell disclosed in the Patent Document 1 is equipped with a wound electrode body inside a film-like outer packaging material, which is created by layering a positive electrode and a negative electrode with an electrolyte therebetween and winding the assembly.

The Patent Document 1 discloses a structure wherein a positive electrode lead is attached to a positive electrode with the attachment portion of the positive electrode lead coated with an insulating coating material; a region projecting from the positive electrode is coated with a resin coating material.

The Patent Document 1 also discloses that the insulating coating material partially overlaps the resin coating material; an overlapped portion between the insulating coating material and the resin coating material is provided at the region projecting from the positive electrode with the insulating coating material extended.

The Patent Document 1 also discloses that a portion of the positive electrode lead coated with the resin coating material includes a bending portion.

RELATED ART DOCUMENTS

Patent Documents

Patent Document 1: Japanese Patent Publication No. 2006-004777

TECHNICAL PROBLEM

The insulating coating material disclosed in the above-described Patent Document 1 coats the positive electrode lead and partly overlaps the resin coating material; if the cell falls, this prevents the positive electrode lead from breaking, and prevents short circuiting between the positive electrode lead and the negative electrode lead or the wound electrode body.

When the insulating coating material covers the positive electrode lead, the insulating coating material is interleaved with the outer packaging material where the outer packaging material, which is a laminate film, is welded pinching the positive electrode lead. The insulating coating material does not weld well to the outer packaging material. Therefore, the sealing property at the welded portion of the outer packaging material deteriorates where the outer packaging material pinches the insulating coating material.

That is, when the insulating coating material covers the positive electrode lead as described above, the insulating coating material prevents damage to and short circuits at the positive electrode lead; however, the sealing property of the outer packaging material deteriorates when the insulating coating material covers the positive electrode lead at the welded portion of the outer packaging material.

The purpose of the present invention is to provide an electrochemical element having an electrode body covered with a laminate-film jacket; the electrochemical element structured to prevent damage to and short circuits in a positive electrode lead while preventing decreased sealing ability of the laminate-film jacket.

SUMMARY

A laminate-type cell according to an embodiment of the present invention comprises: an electrode body including a positive electrode, a negative electrode, and a separator; a positive terminal connected to the positive electrode and extending outward from the electrode body; a negative terminal connected to the negative electrode and extending outward from the electrode body; a sheet-like laminate-film jacket having a welded portion at the peripheral portion, the jacket covering the electrode body and pinching the positive terminal and the negative terminal; a sealing material located between the positive terminal and the laminate-film jacket and between the negative terminal and the laminate-film jacket at the welded portion; and an insulating material having an electrically insulating property, each coating the positive terminal and the negative terminal. The positive terminal and the sealing material include a plurality of bending portions inside the laminate-film jacket. The insulating material partly coats the sealing material near the electrode body. The sealing material includes an insulating material coated portion coated with the insulating material and a laminate-film jacket welded portion pinched by the laminate-film jacket at the welded portion of the laminate-film jacket (First Configuration).

The above-described configuration prevents the insulating material from covering the portion of the sealing material in the welded portion of the laminate-film jacket. That is, the positive terminal and the sealing material include the plurality of bending portions inside the laminate-film jacket, thereby facilitating the positioning of the insulating material relative to the sealing material when covering a part of the sealing material near the electrode body with the insulating material. Thereby, it is possible to prevent the insulating material from covering portions other than the insulating material coated portion of the sealing material.

Thereby, it is further possible to prevent the insulating material from being pinched between the sealing material and the laminate-film jacket at the welded portion of the laminate-film jacket. Thus, it is possible to prevent decreased sealing ability at the welded portion.

Further, the insulating material coats a part of the positive terminal and a part of the sealing material, thereby preventing damage and short circuits of the positive terminal.

As such, the configuration as described above makes it possible to prevent damage to and short-circuiting at the positive terminal while preventing decreased sealing ability of the laminate-film jacket.

According to the first configuration, the negative terminal and the sealing material include a plurality of bending portions inside the laminate-film jacket (Second Configuration). Thereby, similarly to the positive terminal, the negative terminal makes it possible to prevent damage and short-circuiting while preventing decreased sealing ability of the laminate-film jacket.

According to the first or the second configuration, the plurality of bending portions in the positive terminal and the sealing material includes two bending portions inside the laminate-film jacket; and the positive terminal and the sealing material are bent into a crank shape (Third Configuration).

Thereby, the positive terminal and the sealing material can be arranged compactly inside the laminate-film jacket while the insulating material can be more reliably positioned relative to the sealing material. As such, the present invention provides a compact configuration that makes it possible to prevent damage and short circuiting at the positive terminal while preventing decreased sealing ability of the laminate-film jacket.

According to the second configuration, the plurality of bending portions of the negative terminal and the sealing material includes two bending portions inside the laminate-film jacket; the negative terminal and the sealing material are bent into a crank shape (Fourth Configuration).

Thereby, the negative terminal and the sealing material can be arranged compactly inside the laminate-film jacket while the insulating material can be more reliably positioned relative to the sealing material. As such, the present invention provides a compact structure that makes it possible to prevent damage and short circuiting at the negative terminal while preventing decreased sealing property of the laminate-film jacket.

The positive electrode, negative electrode, and separator may have strip-like shapes in any of the first through fourth configurations. The electrode body is a wound electrode body created by winding the positive electrode, the negative electrode, and the separator which are layered with the separator located between the positive electrode and the negative electrode. (Fifth Configuration).

Given the electrode body is a wound electrode body as described above, the positive terminal and the sealing material include a plurality of bending portions inside the laminate-film jacket and outside the wound electrode body. Thereby, it is possible to facilitate the positioning of the insulating material when covering a portion of the sealing material with the insulating material. As such, the structure as described above makes it possible to more reliably prevent damage and short-circuiting at the positive terminal while more reliably preventing decreased sealing ability of the laminate-film jacket.

According to the fifth configuration, the positive terminal is connected to the beginning of the winding of the wound electrode body (Sixth Configuration). According to the above-described configuration, the positive terminal and the sealing material connected to the wound electrode body include a plurality of bending portions inside the laminate-film jacket. Thereby, it is possible to facilitate the positioning of the insulating material when covering a portion of the sealing material with the insulating material. As such, the configuration described above makes it possible to more reliably prevent damage and short circuiting at the positive terminal while more reliably preventing decreased sealing ability of the laminate-film jacket.

EFFECTS

In an electrochemical element according to an embodiment of the present invention, the positive terminal connected to the positive electrode and the sealing material between the positive terminal and the laminate-film jacket at the welded portion of the laminate-film jacket have the plurality of bending portions inside the laminate-film jacket. The sealing material includes the insulating material coated portion coated with the insulating material at a portion near the electrode body and the laminate-film jacket welded portion pinched by the laminate-film jacket at the welded portion of the laminate-film jacket. Thereby, the present invention provides an electrochemical element that is structured to prevent damage and short circuiting at the positive terminal while preventing decreased sealing ability of the laminate-film jacket.

DETAILED DESCRIPTION

Figure 1:
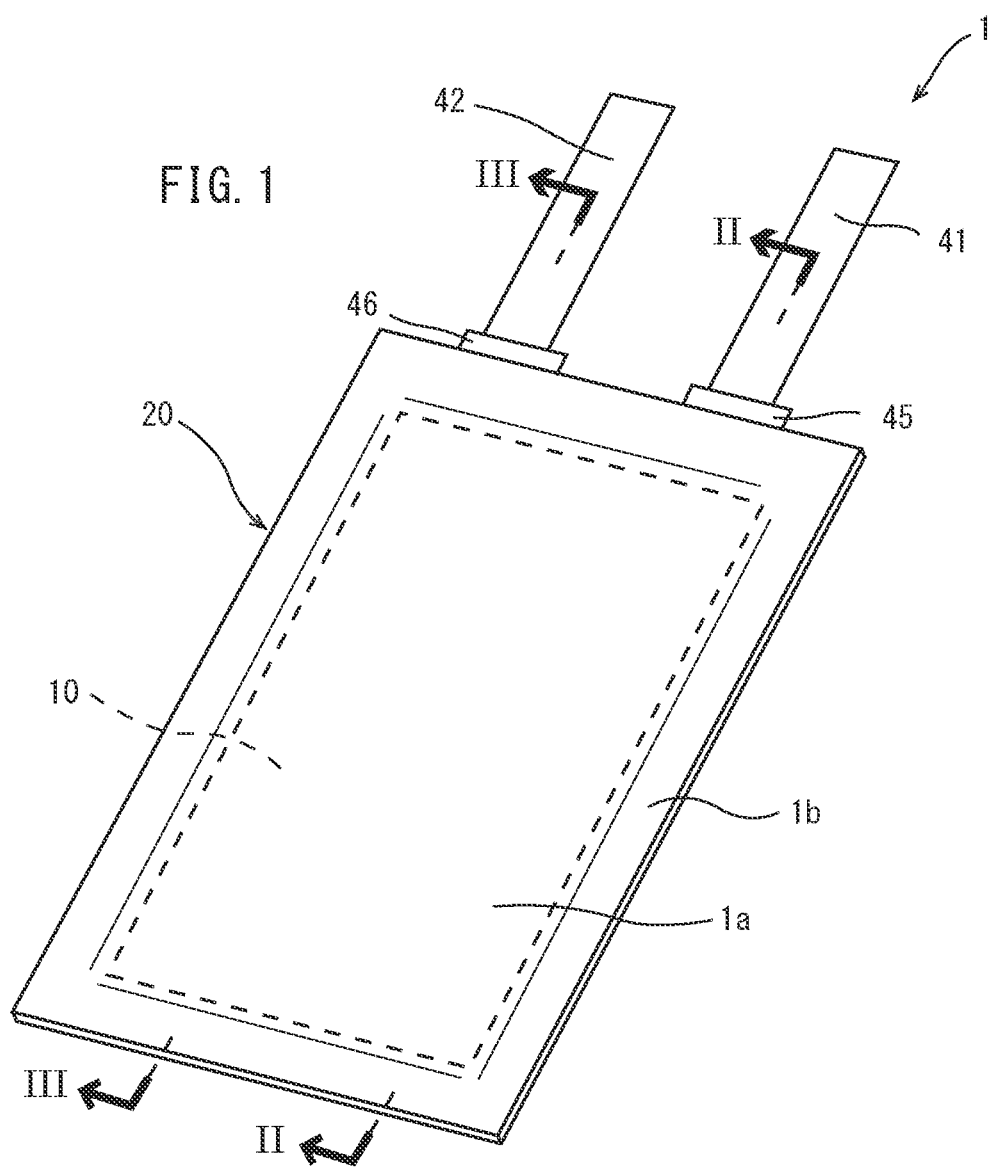
FIG. 1 is a perspective view of a laminate-type cell according to an embodiment.

An embodiment according to the present invention is described in detail below with reference to the drawings. Same reference numerals are used for the same and corresponding components and the descriptions therefor are not repeated.

Overall Configuration

Figure 2:
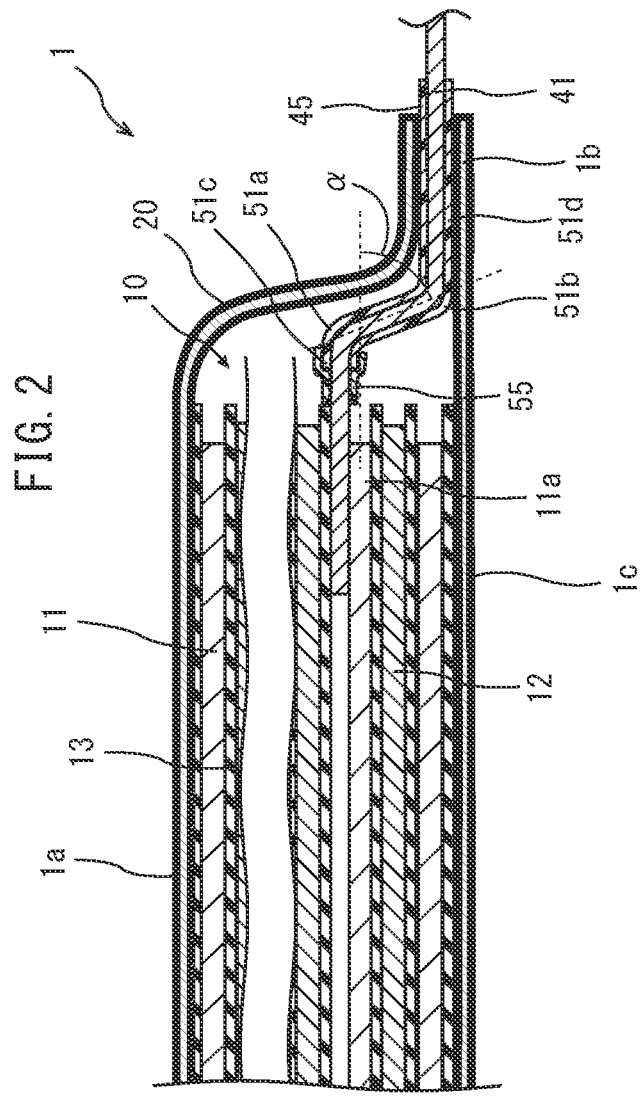
FIG. 2 is a cross-sectional view along II-II line of FIG. 1.
Figure 3:
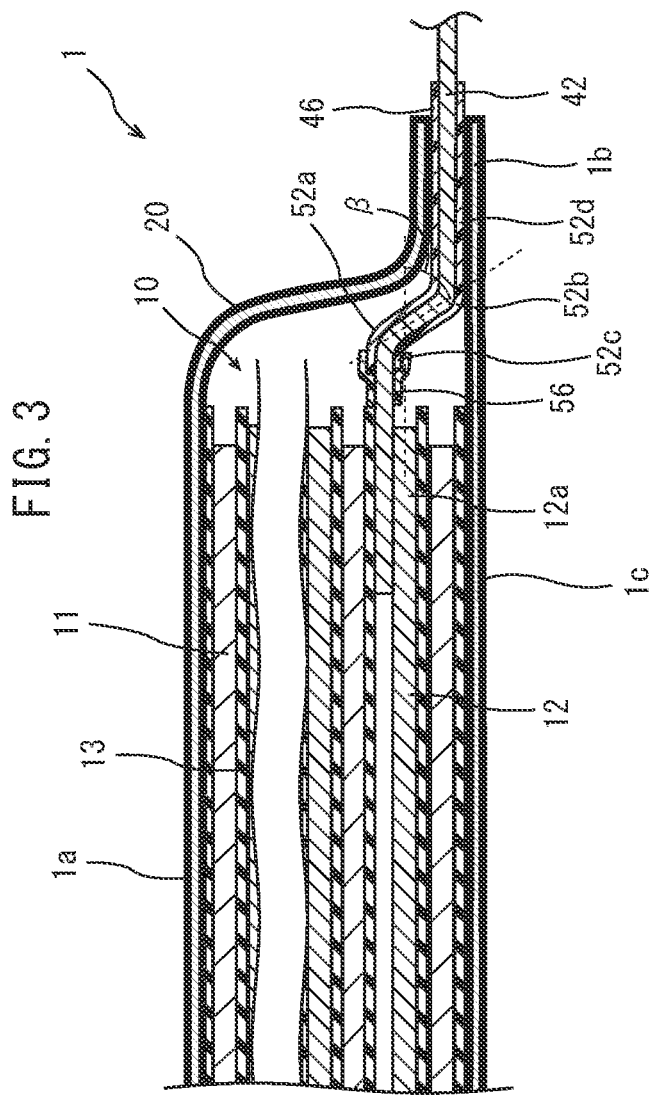
FIG. 3 is a cross-sectional view along line of FIG. 1.

FIG. 1 is a perspective view illustrating the schematic structure of a laminate-type cell 1 according to an embodiment of the present invention. FIG. 2 and FIG. 3 are cross-sectional views illustrating the schematic structure of the laminate-type cell 1. The laminate-type cell 1 is a secondary cell that appears rectangular in plan view; the laminate-type cell 1 includes an electrode body 10 that serves as a power generator; the electrode body is covered with a laminate-film jacket 20. Note that portions of the electrode body 10 are omitted from FIG. 2.

As shown in FIGS. 1 to 3, the laminate-type cell 1 includes the electrode body 10 and the laminate-film jacket 20 which covers the electrode body 10. The laminate-type cell 1 includes a positive terminal 41 and a negative terminal 42 electrically connected to a positive electrode 11 and a negative electrode 12 of the electrode body 10, respectively. A non-aqueous electrolyte is also sealed inside the laminate-type cell 1.

The laminate-film jacket 20 is made up of a sheet-like material including an aluminum foil where one surface is coated with nylon and the other surface is coated with polypropylene. That is, the laminate-film jacket 20 is made up of aluminum laminated with nylon and polypropylene.

Laminate-film jackets 20 are welded to each other by applying heat and pressure thereto as polypropylene layers of the laminate-film jackets 20 are brought into contact with each other. That is, since the polypropylene of the laminate-film jacket 20 melts when heat is applied, the laminate-film jackets 20 can be welded to each other by heating and then cooling the polypropylene while both polypropylene layers of the laminate-film jackets 20 are brought into contact with each other.

The laminate-film jacket 20 is a substantially rectangular shape. The peripheral portions of a pair of the laminate-film jackets 20 are welded to each other with the electrode body 10 sandwiched between the pair of the laminate-film jackets 20 to thereby create a bulging portion 1a and a welded portion 1b as shown in FIG. 1 to FIG. 3. That is, the laminate-film jackets 20 cover the electrode body 10 to create a bulging portion 1a and are welded to each other around the bulging portion 1a to create the welded portion 1b around the bulging portion 1a.

As described later, according to this embodiment, a cylindrical wound electrode body is flattened to create the electrode body 10. That is, the electrode body 10 is rectangular in plan view. Therefore, the bulging portion 1a appears rectangular when the laminate-film jacket 20 is viewed on plane (hereinafter, simply referred to as a plan view) as shown in FIG. 1. The welded portion 1b is formed around the bulging portion 1a allowing the laminate-type cell 1 to have a rectangular shape.

As shown in FIG. 2 and FIG. 3, the peripheral portions of the pair of the laminate-film jackets 20 are welded with the electrode body 10 sandwiched therebetween so that the laminate-type cell 1 has a flat portion 1c on one side of the electrode body 10 in the thickness direction and the above-described bulging portion 1a on the other side of the electrode body 10 in the thickness direction. That is, the pair of the laminate-film jackets 20 conforms to the contour of the electrode body 10.

As described later, the positive terminal 41 and the negative terminal 42 are secured by welding the laminate-film jackets 20 together at the welded portion 1b located near the edge of the laminate-type cell 1 lengthwise with the positive terminal 41 and the negative terminal 42 sandwiched therebetween.

Although this embodiment discloses that the peripheral portions of the pair of the laminate-film jackets 20 are welded to each other, the welding structure is not limited to this embodiment; a single laminate-film jacket may be folded over to envelope the electrode body 10 and then welded. The fold of the laminate-film jacket may be along the extension direction or along the width direction of the positive terminal 41 and the negative terminal 42 relative to the electrode body 10.

Electrode Body

In the following description, the winding axis direction of the electrode body 10 represents the direction along an axis line L shown in FIG. 4. The short diameter direction of the electrode body 10 represents a direction of the smallest diameter of the electrode body 10 when the electrode body 10 is viewed along the winding axis direction. The long diameter direction of the electrode body 10 represents a direction of the largest diameter of the electrode body 10 when the electrode body 10 is viewed along the winding axis direction.

Figure 4:
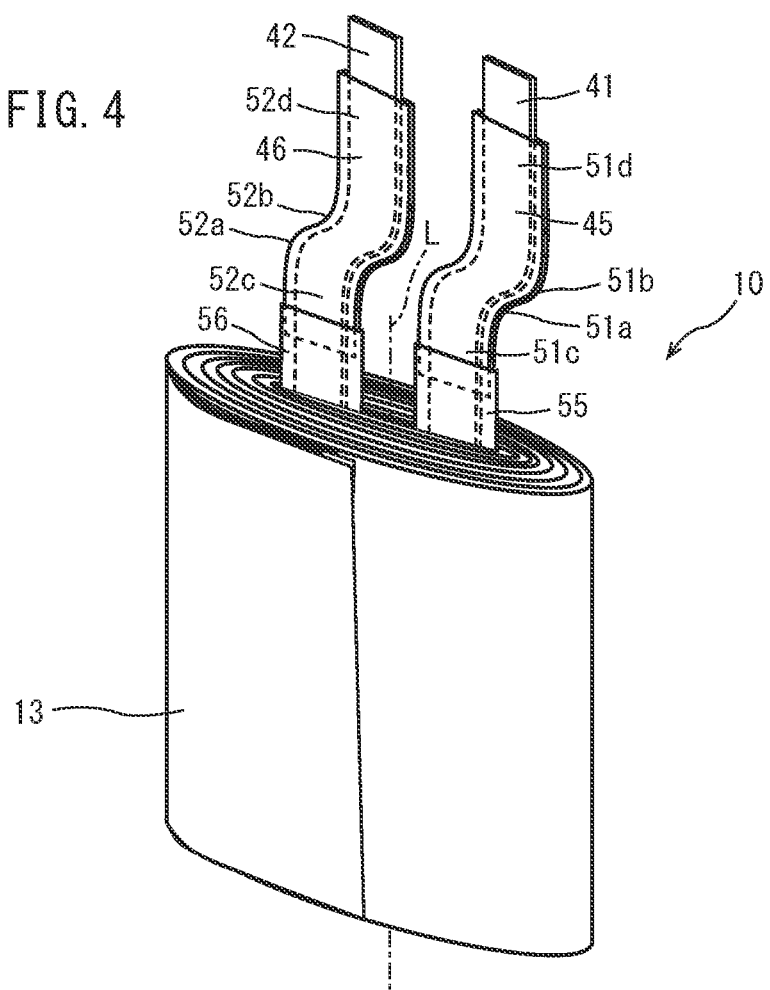
FIG. 4 is a perspective view of a schematic structure of an electrode body.

The electrode body 10 is a wound electrode body flattened into an elliptical shape when viewed along the winding axis direction as shown in FIG. 4. The electrode body 10 is flattened by pressing a wound electrode body created by winding the strip-like positive electrode 11, the strip-like negative electrode 12, and the strip-like separators 13 layered with a separator between a positive electrode 11 and a negative electrode 12 and between the positive electrode 11 and the laminate-film jacket 20. The flattened electrode body 10 is housed in a space created by the laminate-film jacket 20.

Figure 5:
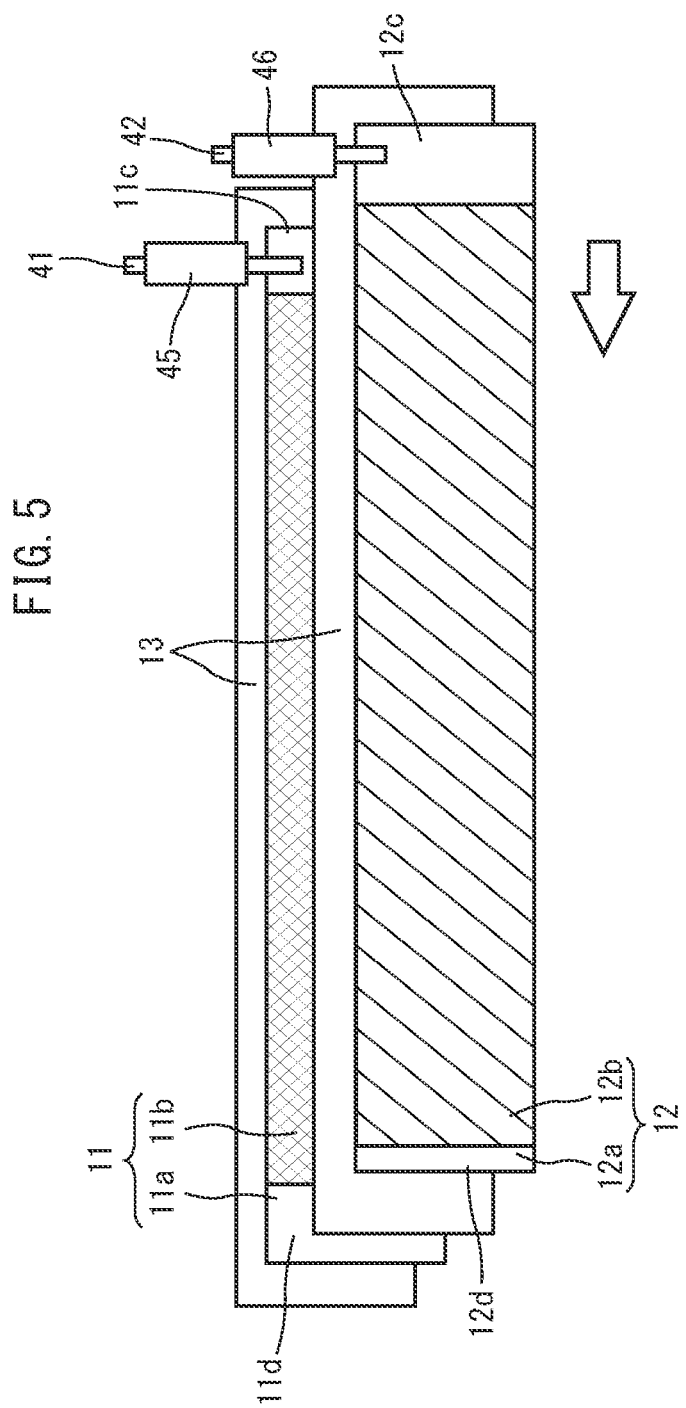
FIG. 5 schematically illustrates a state where a positive electrode, a negative electrode, and a separator are laminated in the thickness direction.

FIG. 5 schematically shows a method of creating the electrode body 10. As shown in FIG. 5, the positive electrode 11, the negative electrode 12, and the separators 13 are layered in the thickness direction in the order from the top with: negative electrode 12, separator 13, positive electrode 11, and separator 13. In this state, the positive electrode 11, the negative electrode 12, and the separators 13 are wound around a mandrel (not shown) in the direction of the unfilled arrow shown in FIG. 5 to create a substantially cylindrical electrode body.

In FIG. 5, the positions of the positive electrode 11, the negative electrode 12, and the separators 13 are slightly shifted from the actual positions and are viewed diagonally in order to illustrate a state where the positive electrode 11, the negative electrode 12, and the separators 13 are layered. Further, in FIG. 5 the positive electrode active material layer 11b of the positive electrode 11 and the negative electrode active material layer 12b of the negative electrode 12 are hatched in order to distinguish those parts from the others despite illustrating none of cross-sections.

The cylindrical electrode body obtained as above described is then pressed to thus create the flattened electrode body 10 shown in FIG. 4. That is, the electrode body 10 is a wound electrode body created by winding a positive electrode 11, a negative electrode 12, and separators 13 that are layered with separators 13 between the positive electrode 11 and the negative electrode 12.

As shown in FIG. 5, the positive electrode 11 includes a positive electrode current collector 11a made of a metal foil such as an aluminum foil and the positive electrode active material layers 11b that contain a positive electrode active material and are provided on both surfaces of the positive electrode current collector 11a. Specifically, the positive electrode is created by applying a positive electrode mixture containing a positive electrode active material that is a lithium containing oxide capable of absorbing and releasing lithium ions, a conductive aid, and a binder and so forth onto the positive electrode current collector 11a made up of an aluminum foil or the like, and then drying the positive electrode mixture. For example, a lithium containing oxide such as a lithium cobalt oxide including $LiCoO_2$, a lithium manganese oxide including $LiMn_2O_4$, and a lithium nickel oxide including $LiNiO_2$ is preferably used as the lithium containing oxide that is a positive electrode active material. Further, only one type of material may be used as the positive electrode active material, however two or more types of materials may be used for the same. The positive electrode active material is not limited to the above-described materials.

As shown in FIG. 5, the positive electrode 11 has positive-electrode current collector tabs 11c, 11d exposed at both ends of the positive electrode current collector 11a lengthwise on both surfaces where there is no positive electrode active material layer 11b. That is, the positive-electrode current-collector tab 11c is located at one end of the positive electrode 11 lengthwise, and the positive-electrode current-collector tab 11d is located at the other end of the positive electrode 11 lengthwise. In the electrode body 10 according to this embodiment, the positive-electrode current-collector tab 11c is located at the beginning of the winding of the electrode body 10 (inside the electrode body 10), and the positive-electrode current-collector tab 11d is located at the end of the winding of the electrode body 10 (the outermost side of the electrode body 10).

The negative electrode 12 includes a negative electrode current collector 12a made of a metal foil such as a copper foil and the negative electrode active material layers 12b that contain a negative electrode active material and are provided on both surfaces of the negative electrode current collector 12a. Specifically, the negative electrode 12 is created by applying a negative electrode mixture containing a negative electrode active material capable of absorbing and releasing lithium ions, a conductive aid, and a binder and so forth onto the negative electrode current collector 12a made up of a copper foil or the like, and then drying the negative electrode mixture. For example, a carbon material (graphite, pyrolytic carbon, coke series, glassy carbons, etc.) capable of absorbing and releasing lithium ions is preferably used as a negative electrode active material. The negative electrode active material is not limited to the above-described materials.

As shown in FIG. 5, similarly to the positive electrode 11, the negative electrode 12 has negative-electrode current-collector tabs 12c, 12d exposed at both ends of the negative electrode current collector 12a lengthwise on both surfaces where there is no negative electrode active material layer 12b. That is, the negative-electrode current-collector tab 12c is located at one end of the negative electrode 12 lengthwise, and the negative-electrode current-collector tab 12d is located at the other end of the negative electrode 12 lengthwise. In the electrode body 10 according to this embodiment, the negative-electrode current-collector tab 12c is located at the beginning of the winding of the electrode body 10 (inside the electrode body 10), and the negative-electrode current-collector tab 12d is located at the end of the winding of the electrode body 10 (the outermost side of the electrode body 10).

The positive terminal 41 is connected to the positive-electrode current-collector tab 11c of the positive electrode 11 located at the beginning of the winding of the electrode body 10. The negative terminal 42 is connected to the negative-electrode current-collector tab 12c of the negative electrode 12 located at the beginning of the winding of the electrode body 10. That is, the positive terminal 41 and the negative terminal 42 are connected to the beginning of the winding of the electrode 10. The positive terminal 41 and the negative terminal 42 extend outward from the electrode body 10 and also extend outward from the laminate-film jacket 20.

Positive Terminal and Negative Terminal

Next, the structures of the positive terminal 41 and the negative terminal 42 are specifically described with reference to FIG. 1 to FIG. 4.

The positive terminal 41 is an aluminum foil formed into a rectangular shape in plan view. The positive terminal 41 is structured so that one end thereof lengthwise is welded to the positive-electrode current-collector tab 11c of the positive electrode 11 and the other end thereof lengthwise is located outside the laminate-film jacket 20 (see FIG. 1 and FIG. 2). That is, the laminate-film jacket 20 pinches the positive terminal 41, and the positive terminal 41 extends from the inside to outside of the laminate-film jacket 20.

The negative terminal 42 is a metal foil such as a copper or nickel foil formed into a rectangular shape in plan view. The negative terminal 42 is structured so that one end thereof lengthwise is welded to the negative-electrode current-collector tab 12c of the negative electrode 12 and the other end lengthwise is outside the laminate-film jacket 20 (see FIG. 1 and FIG. 3). That is, the laminate-film jacket 20 pinches the negative terminal 42, and the negative terminal extends from inside to outside the laminate-film jacket 20.

The laminate-type cell 1 adopts a positive terminal 41 and a negative terminal 42 having the above described structure, thereby making it possible for the laminate-type cell to have a lower impedance than a structure wherein the connection terminal is pulled outside through other connection components.

As shown in FIG. 1 to FIG. 3, a positive electrode sealing material 45 and a negative electrode sealing material 46 are provided on the surfaces of the positive terminal 41 and the negative terminal 42 at the portions where the laminate-film jacket 20 pinches the positive terminal 41 and the negative terminal 42. That is, the positive electrode sealing material 45 is provided between the laminate-film jacket 20 and the positive terminal 41 while the negative electrode sealing material 46 is provided between the laminate-film jacket 20 and the negative terminal 42. The positive electrode sealing material 45 and the negative electrode sealing material 46 correspond to the sealing material.

The positive electrode sealing material 45 and the negative electrode sealing material 46 are each constituted by a rectangular sheet in plan view made up of a resin material such as polypropylene (PP). The positive electrode sealing material 45 and the negative electrode sealing material 46 lay along the positive terminal 41 and the negative terminal 42 to pinch the positive terminal 41 and the negative terminal 42 respectively, thereby allowing the positive electrode sealing material 45 and the negative electrode sealing material 46 to coat each surface of the positive terminal 41 and the negative terminal 42, respectively.

Thereby, it is possible to increase the bonding strength between the laminate-film jacket 20, and the positive terminal 41 and the negative terminal 42 inserted therein while providing more reliable electrical insulation of the positive terminal 41 and the negative terminal 42 from the laminate-film jacket 20.

The positive terminal 41 and the positive electrode sealing material 45 have a first positive electrode bending portion 51a and a second positive electrode bending portion 51b that are bent in the thickness direction at portions where the positive terminal 41 is coated with the positive electrode sealing material 45. The first positive electrode bending portion 51a and the second positive electrode bending portion 51b are side by side along the length of the positive terminal 41 and the positive electrode sealing material 45. The first positive electrode bending portion 51a and the second positive electrode bending portion 51b are inside the laminate-film jacket 20. The first positive electrode bending portion 51a and the second positive electrode bending portion 51b are formed so that the smaller of the supplementary angles formed between a line segment through the first positive electrode bending portion 51a and the second positive electrode bending portion 51b of the positive terminal 41 and the positive electrode sealing material 45, and a line segment along the positive electrode current collector 11a is set to a prescribed angle $\alpha$ in the cross-sectional view of the positive terminal 41 in the extension direction. The first positive electrode bending portion 51a and the second positive electrode bending portion 51b each corresponds to the bending portion.

As described above, the positive terminal 41 is connected to the beginning of the winding of the electrode body 10 in the positive electrode 11. Therefore, the first positive electrode bending portion 51a is located in the positive terminal 41 and the positive electrode sealing material 45 near the electrode body 10, and is bent in the short diameter direction of the electrode body 10. The second positive electrode bending portion 51b is located closer to the end of the extension direction of the positive terminal 41 (at the other end lengthwise) than the first positive electrode bending portion 51a, and is bent in the winding axis direction of the electrode 10. That is, the positive terminal 41 and the positive electrode sealing material 45 are bent into a crank shape when viewed from the long diameter direction of the electrode 10, thereby approaching the flat portion 1c of the laminate-type cell 1.

The positive terminal 41 and the positive electrode sealing material 45 have a portion thereof coated with the insulating material (insulating material coated portion; hereafter referred to as the positive-electrode insulated portion 51c) and portion thereof in welded with the laminate-film jacket (laminate-film jacket welded portion; hereafter referred to as the positive-electrode welded portion 51d) in order from the electrode body 10. The positive-electrode insulated portion 51c is located between the electrode body 10 and the first positive electrode bending portion 51a and is coated with a later-described positive electrode insulating material 55. The positive-electrode welded portion 51d is located closer to the end of extension direction of the positive terminal 41 (at the other end lengthwise) than the second positive electrode bending portion 51b. The laminate-film jacket 20 pinches the positive-electrode welded portion 51d at the welded portion 1b of the laminate-type cell 1.

The first positive electrode bending portion 51a and the second positive electrode bending portion 51b are formed in the positive terminal 41 and the positive electrode sealing material 45 after the positive terminal 41 with attached positive electrode sealing material 45 is welded to the positive electrode 11.

The positive-electrode insulated portion 51c of the positive terminal 41 and the positive electrode sealing material 45 is coated with the positive electrode insulating material 55 (insulating material). That is, the positive electrode insulating material 55 coats an exposed portion of the positive terminal 41 and the portion of the positive electrode sealing material 45 near the electrode body 10 at the positive-electrode insulated portion 51c. For example, the positive electrode insulating material 55 may be a resinous tape composed of material having an electrically insulating property, such as PP.

Thereby, it is possible to prevent the positive terminal 41 from disconnecting at the tip end of the positive electrode sealing material 45 near the electrode body 10, due for instance, to the laminate-type cell 1 being dropped. That is, it is possible to prevent damage of the positive terminal 41 by providing the positive-electrode insulated portion 51c. Further, the positive electrode insulating material 55 coats the exposed portion of the positive terminal 41 at the positive-electrode insulated portion 51c, thereby preventing short circuits between the positive terminal 41, and the negative electrode 12 and the negative terminal 42.

As described above, the positive terminal 41 coated with the positive electrode sealing material 45 may have a plurality of bending portions (two bending portions in this embodiment), i.e., a first positive electrode bending portion 51a and a second positive electrode bending portion 51b; it is therefore possible to provide the positive terminal 41 and the positive electrode sealing material 45 with a positive-electrode insulated portion 51c and a positive-electrode welded portion 51d. Thereby, it is possible to separate a portion coated with the positive electrode insulating material 55 and a portion pinched by the laminate-film jacket 20 in the positive terminal 41 and the positive electrode sealing material 45.

Thus, the positive electrode insulating material 55 can be accurately positioned relative to the positive terminal 41 and the positive electrode sealing material 45 when coating the positive terminal 41 and the positive electrode sealing material 45 with the positive electrode insulating material 55. As such, it is possible to more reliably coat a part of the positive electrode sealing material 45 near the electrode body 10 with the positive electrode insulating material 55 while preventing the laminate-film jacket 20 from pinching the positive electrode insulating material 55. Thereby, it is possible to prevent damage and short-circuiting of the positive terminal 41 while preventing decreased sealing ability of the laminate-film jacket 20.

Similarly to the positive terminal 41 and the positive electrode sealing material 45, the negative terminal 42 and the negative electrode sealing material 46 have a first negative electrode bending portion 52a and a second negative electrode bending portion 52b that are bent in the thickness direction at portions where the negative terminal 42 is coated with the negative electrode sealing material 46. The first negative electrode bending portion 52a and the second negative electrode bending portion 52b are provided side by side along the length of the negative terminal 42 and the negative electrode sealing material 46. The first negative electrode bending portion 52a and the second negative electrode bending portion 52b are inside the laminate-film jacket 20. The first negative electrode bending portion 52a and the second negative electrode bending portion 52b are formed so that the smaller of the supplementary angles formed between a segment line through the first negative electrode bending portion 52a and the second negative electrode bending portion 52b of the negative terminal 42 and the negative electrode sealing material 46, and a segment line along the negative electrode current collector 12a is set to a prescribed angle β in the cross-sectional view of the negative terminal 42 in the extension direction. The first negative electrode bending portion 52a and the second negative electrode bending portion 52b each corresponds to the bending portion.

As described above, similarly to the positive terminal 41, the negative terminal 42 is connected to the beginning of the winding of the electrode body 10 in the negative electrode 12. Therefore, the first negative electrode bending portion 52a is near the electrode body 10 of the negative terminal 42 and the negative electrode sealing material 46, and is bent in the short diameter direction of the electrode body 10. The second negative electrode bending portion 52b is located closer to the end of extension direction (at the other end lengthwise) of the negative terminal 42 than the first negative electrode bending portion 52a, and is bent in the winding axis direction of the electrode 10. That is, the negative terminal 42 and the negative electrode sealing material 46 are bent into a crank shape when viewed from the long diameter direction of the electrode 10, thereby approaching the flat portion 1c of the laminate-type cell 1.

Similarly to the positive terminal 41 and the positive electrode sealing material 45, the negative terminal 42 and the negative electrode sealing material 46 have a negative-electrode insulated portion 52c (insulating material coated portion) and a negative-electrode welded portion 52d (laminate-film jacket welded portion) in order from the electrode body 10. The negative-electrode insulated portion 52c is located between the electrode body 10 and the first negative electrode bending portion 52a and is coated with a later-described negative electrode insulating material 56. The negative-electrode welded portion 52d is located closer to the end of extension direction of the negative terminal 42 (at the other end lengthwise) than the second negative electrode bending portion 52b, and is pinched by the laminate-film jacket 20 at the welded portion 1b of the laminate-type cell 1.

Similarly to the first positive electrode bending portion 51a and the second positive electrode bending portion 51b, the first negative electrode bending portion 52a and the second negative electrode bending portion 52b are formed in the negative terminal 42 and the negative electrode sealing material 46 after the negative terminal 42 with attached negative electrode sealing material 46 is welded to the negative electrode 12.

Similarly to the positive terminal 41 and the positive electrode sealing material 45, the negative-electrode insulated portion 52c of the negative terminal 42 and the negative electrode sealing material 46 is coated with the negative electrode insulating material 56 (insulating material). That is, the negative electrode insulating material 56 coats the exposed portion of the negative terminal 42 and the portion of the negative electrode sealing material 46 near the electrode body 10 of the negative-electrode insulated portion 52c. For example, the negative electrode insulating material 56 may be a resinous tape composed of material having an electrically insulating property, such as PP.

Thereby, it is possible to prevent the negative terminal 42 from disconnecting at the tip end of the negative electrode sealing material 46 near the electrode body 10, due, for instance, to the laminate-type cell 1 being dropped. That is, it is possible to prevent damage of the negative terminal 42 by providing the negative-electrode insulated portion 52c. Further, the negative electrode insulating material 56 coats the exposed portion of the negative terminal 42 at the negative-electrode insulated portion 52c, thereby preventing short circuiting between the negative terminal 42 and the positive electrode 11 and the positive terminal 41.

As described above, the negative terminal 42 coated with the negative electrode sealing material 46 may have a plurality of bending portions (two bending portions in this embodiment), i.e., a first negative electrode bending portion 52a and a second negative electrode bending portion 52b; it is possible to provide the negative terminal 42 and the negative electrode sealing material 46 with the negative-electrode insulated portion 52c and the negative-electrode welded portion 52d. Thereby, it is possible to separate the portion coated with the negative electrode insulating material 56 and the portion pinched by the laminate-film jacket 20 in the negative terminal 42 and the negative electrode sealing material 46.

Thus, the negative electrode insulating material 56 can be accurately positioned relative to the negative terminal 42 and the negative electrode sealing material 46 when coating the negative terminal 42 and the negative electrode sealing material 46 with the negative electrode insulating material 56. As such, it is possible to more reliably coat the part of the negative electrode sealing material 46 near the electrode body 10 with the negative electrode insulating material 56 while preventing the laminate-film jacket 20 from pinching the negative electrode insulating material 56. Thereby, it is possible to prevent damage and short-circuiting at the negative terminal 42 while preventing decreased sealing ability of the laminate-film jacket 20.

Other Embodiments

An embodiment according to the present invention is described above, but such an embodiment is merely an example for implementing the present invention. Therefore, without being limited to the above-described embodiment it is possible to realize the present invention by modifying the embodiment as appropriate without deviating from the spirit of the invention.

According to the above-described embodiment, the positive terminal 41 and the positive electrode sealing material 45 have a first positive electrode bending portion 51a and a second positive electrode bending portion 51b that are bent in the thickness direction at portions where the positive terminal 41 is coated with the positive electrode sealing material 45. However, the positive terminal and the positive electrode sealing material may have three or more bending portions.

According to the above-described embodiment, the negative terminal 42 and the negative electrode sealing material 46 have a first negative electrode bending portion 52a and a second negative electrode bending portion 52b that are bent in the thickness direction at portions where the negative terminal 42 is coated with the negative electrode sealing material 46. However, the negative terminal and the negative electrode sealing material may have three or more bending portions.

According to the above-described embodiment, the negative terminal 42 and the negative electrode sealing material 46 have a first negative electrode bending portion 52a and a second negative electrode bending portion 52b that are bent in the thickness direction at portions where the negative terminal 42 is coated with the negative electrode sealing material 46. However, the negative terminal and the negative electrode sealing material do not need to have the bending portions. That is, the bending portion maybe provided at just a portion where the mechanically weak positive terminal 41 is coated with the positive electrode sealing material 45. Further, the bending portion may be provided at a portion of the positive terminal 41 not coated with the positive electrode sealing material 45 and at a portion of the negative terminal 42 not coated with the negative electrode sealing material 46.

According to the embodiment described above, as shown in FIG. 2, the first positive electrode bending portion 51a and the second positive electrode bending portion 51b are formed so that the smaller of the supplementary angles formed between a segment line through the first positive electrode bending portion 51a and the second positive electrode bending portion 51b of the positive terminal 41 and the positive electrode sealing material 45, and a segment line along the positive electrode current collector 11a is set to a prescribed angle $\alpha$ in the cross-sectional view of the positive terminal 41 in the extension direction.

Figure 6:
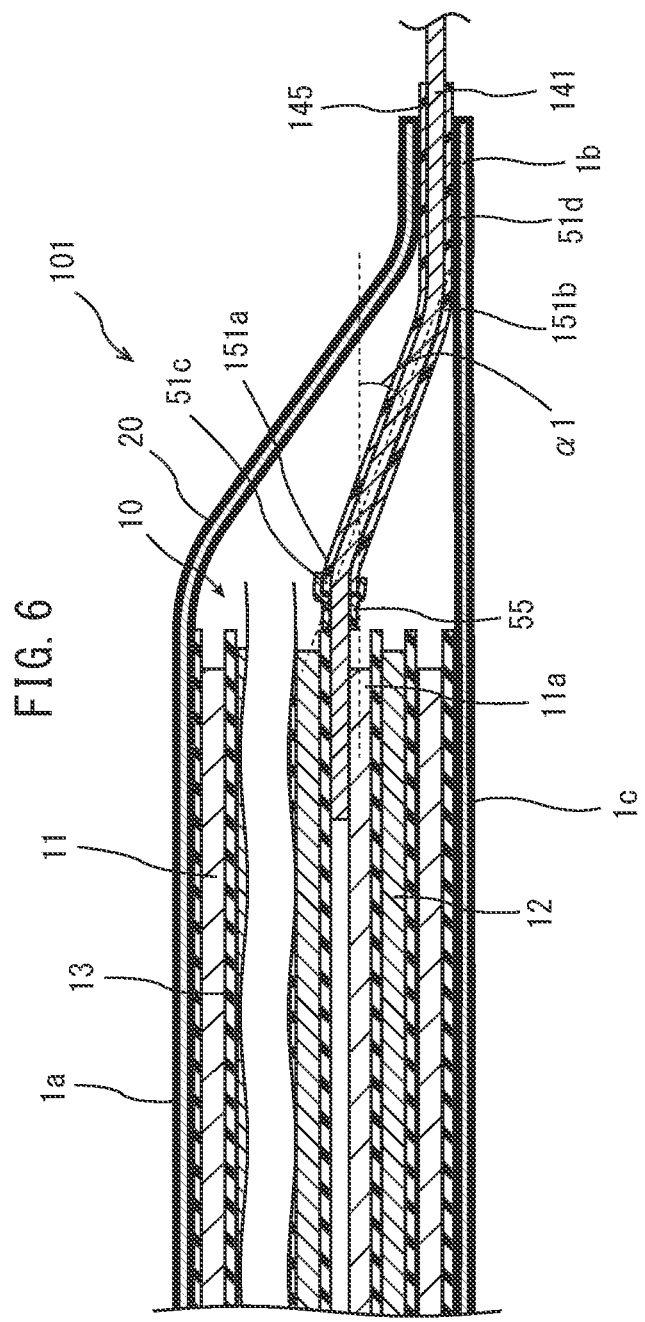
FIG. 6 is a view illustrating a laminate-type cell according to another embodiment corresponding to FIG. 2.

However, as shown in FIG. 6, a first positive electrode bending portion 151a and a second positive electrode bending portion 151b may be formed so that the smaller angle $\alpha 1$ of the supplementary angles formed between a line segment through the first positive electrode bending portion 151a and the second positive electrode bending portion 151b of a positive terminal 141 and a positive electrode sealing material 145, and a line segment along the positive electrode current collector 11a is set smaller than a prescribed angle $\alpha$ in the cross-sectional view of the positive terminal 141 in the extension direction. A reference numeral 101 shown in FIG. 6 represents a laminate-type cell. In FIG. 6, the same reference numerals represent the same structures illustrated in FIG. 2.

Although not shown here, similarly, a first negative electrode bending portion and a second negative electrode bending portion in the negative terminal may also be formed so that the smaller of the supplementary angles formed between a line segment through the first negative electrode bending portion and the second negative electrode bending portion in the negative terminal and the negative-electrode sealing material, and a line segment along the negative-electrode current collector is set smaller than an angle β shown in FIG. 3 in the thickness direction of the negative terminal.

According to the above embodiment, the positive electrode sealing material 45 and the negative electrode sealing material 46 are constituted by a resin material such as PP. However, any material may be used for the positive electrode sealing material and the negative electrode sealing material as long as the material can be welded to the laminate-film jacket.

According to the above embodiment, the positive electrode insulating material 55 and the negative electrode insulating material 56 are constituted by a resin material such as PP. However, any material may be used for the positive electrode insulating material and the negative electrode insulating material as long as the material can prevent damage and short-circuiting at the positive terminal and the negative terminal. Further, a material other than tape may be used for the positive electrode insulating material 55 and the negative electrode insulating material 56.

According to the above embodiment, the positive electrode sealing material 45 is provided on the surface of the positive terminal 41. However, the positive electrode sealing material 45 may completely or partially coat the surface of the positive-electrode current-collector tab 11c, or coat the welded portion between the positive terminal 41 and the positive-electrode current-collector tab 11c or the surface opposite the welded portion of the positive-electrode current collector 11a.

According to the above embodiment, the negative electrode sealing material 46 is provided on the surface of the negative terminal 42. However, the negative electrode sealing material 46 may completely or partially coat the surface of the negative-electrode current-collector tab 12c, or coat the welded portion between the negative terminal 42 and the negative-electrode current-collector tab 12c or the surface opposite the welded portion of the negative electrode current collector 12a.

According to the above embodiment, the positive terminal 41 and the negative terminal 42 are connected to the beginning of the winding of the electrode body 10. However, at least either the positive terminal or the negative terminal may be connected to a portion other than the beginning of the winding of the electrode body 10.

According to the above embodiment, the electrode body 10 is a wound electrode body created by winding the strip-like positive electrode 11, the strip-like negative electrode 12, and the strip-like separators 13 layered in the thickness direction. However, the electrode body may be a laminate type electrode created by laminating a sheet-like positive electrode, a negative electrode, and separators in the thickness direction.

According to the above embodiment, the laminate-film jacket 20 is made up of a material created by laminating nylon and polypropylene on an aluminum foil. However, the metal foil of the laminate-film jacket is not limited to an aluminum foil; the foil maybe made of other metal materials such as stainless steel. Any material may be adopted for use in the welded portion of the laminate-film jacket as long as the material melts when heated and cures when cooled and does not melt due to a non-aqueous electrolyte. Further, any material may be adopted for use in the laminate-film jacket other than the welded portion as long as the material can be laminated to a metal foil.

According to the above embodiment, the laminate-type cell 1 is formed into a rectangular shape in plan view. However, the laminate-type cell may have other shapes such as a polygon.

According to the above embodiment, the laminate-type cell 1 is a lithium ion cell. However, the laminate-type cell 1 may be a cell other than a lithium ion cell. Further, the structure of the above-described embodiment may be applied to an electrochemical element including a capacitor or the like without being limited to only the laminate-type cell. That is, the structure of the above-described embodiment can be applied to an electrochemical element capable of storing electricity or generating electricity with a terminal connected to an electrode body extending outward from a laminate-film jacket.

INDUSTRIAL APPLICABILITY

The present invention can be applied to a laminate-type cell with an electrode body covered with a laminate-film jacket.

REFERENCE NUMERALS 1, 101 laminate-type cell (electrochemical element); 1a bulging portion; 1b welded portion; 10 electrode body; 11 positive electrode; 11a positive electrode current collector; 11b positive electrode active material layer; 11c, 11d positive-electrode current-collector tabs; 12 negative electrode; 12a negative electrode current collector; 12b negative electrode active material layer; 12c, 12d negative-electrode current-collector tabs; 13 separator; 20 laminate-film jacket; 41, 141 positive terminal; 42 negative terminal; 45 positive electrode sealing material (sealing material); 46 negative-electrode sealing material (sealing material); 51a, 151a first positive electrode bending portions (bending portions); 51b, 151b second positive electrode bending portions (bending portions); 51c positive-electrode insulated portion (insulating material coated portion); 51d positive-electrode welded portion (laminate-film jacket welded portion); 52a first negative electrode bending portion (bending portion); 52b second negative electrode bending portion (bending portion); 52c negative-electrode insulated portion (insulating material coated portion); 52d negative-electrode welded portion (laminate-film jacket welded portion); 55 positive electrode insulating material (insulating material); 56 negative electrode insulating material (insulating material)

What is claimed is:
1. An electrochemical element comprising:
an electrode body including a positive electrode, a negative electrode, and a separator;
a positive terminal connected to the positive electrode and extending outward from the electrode body;
a negative terminal connected to the negative electrode and extending outward from the electrode body;
a sheet-like laminate-film jacket having a welded portion at the peripheral portion, the jacket coating the electrode body and pinching the positive terminal and the negative terminal;
a sealing material located between the positive terminal and the laminate-film jacket at the welded portion and between the negative terminal and the laminate-film jacket at the welded portion, such that the sealing material covers the length of the positive and negative terminals, respectively, the covered length is the length extending between a portion near the electrode body and a portion extending outside of the laminate-film jacket; and insulating materials having an electrically insulating property, and coating parts of the positive terminal and the negative terminal near the electrode body, wherein the positive terminal and the sealing material include a plurality of bending portions inside the laminate-film jacket;

the insulating material coats a part of the sealing material near the electrode body; and the sealing material includes an insulating material coated portion coated with the insulating material and a laminate-film jacket welded portion pinched by the laminate-film jacket at the welded portion of the laminate-film jacket.

2. The electrochemical element according to claim 1, wherein the negative terminal and the sealing material include a plurality of bending portions inside the laminate-film jacket.

3. The electrochemical element according to claim 2, wherein the plurality of bending portions in the positive terminal and the sealing material are two of the bending portions inside the laminate-film jacket, the positive terminal and the sealing material bent into a crank shape.

4. The electrochemical element according to claim 3, wherein the positive electrode, the negative electrode, and the separator each have strip-like shapes; and the electrode body is a wound electrode body created by winding the positive electrode, the negative electrode, and the separator which are layered with the separator between the positive electrode and the negative electrode.

5. The electrochemical element according to claim 4, wherein the positive terminal is connected to the beginning of the winding of the wound electrode body.

6. The electrochemical element according to claim 2, wherein the plurality of bending portions in the negative terminal and the sealing material are two of the bending portions inside the laminate-film jacket, the negative terminal and the sealing material bent into a crank shape.

7. The electrochemical element according to claim 6, wherein the positive electrode, the negative electrode, and the separator each have strip-like shapes; and the electrode body is a wound electrode body created by winding the positive electrode, the negative electrode, and the separator which are layered with the separator between the positive electrode and the negative electrode.

8. The electrochemical element according to claim 7, wherein the positive terminal is connected to the beginning of the winding of the wound electrode body.

9. The electrochemical element according to claim 2, wherein the positive electrode, the negative electrode, and the separator each have strip-like shapes; and the electrode body is a wound electrode body created by winding the positive electrode, the negative electrode, and the separator which are layered with the separator between the positive electrode and the negative electrode.

10. The electrochemical element according to claim 9, wherein the positive terminal is connected to the beginning of the winding of the wound electrode body.

11. The electrochemical element according to claim 1, wherein the plurality of bending portions in the positive terminal and the sealing material includes two bending portions inside the laminate-film jacket, the positive terminal and the sealing material bent into a crank shape.

12. The electrochemical element according to claim 11, wherein the positive electrode, the negative electrode, and the separator each have strip-like shapes; and the electrode body is a wound electrode body created by winding the positive electrode, the negative electrode, and the separator which are layered with the separator between the positive electrode and the negative electrode.

13. The electrochemical element according to claim 12, wherein the positive terminal is connected to the beginning of the winding of the wound electrode body.

14. The electrochemical element according to claim 1, wherein the positive electrode, the negative electrode, and the separator each have strip-like shapes; and the electrode body is a wound electrode body created by winding the positive electrode, the negative electrode, and the separator which are layered with the separator between the positive electrode and the negative electrode.

15. The electrochemical element according to claim 14, wherein the positive terminal is connected to the beginning of the winding of the wound electrode body.

\* \* \* \* \*